May 18, 1948. H. TROEGER ET AL 2,441,779
SUPERCHARGER REGULATOR AND SURGE CONTROL
Filed Dec. 21, 1945
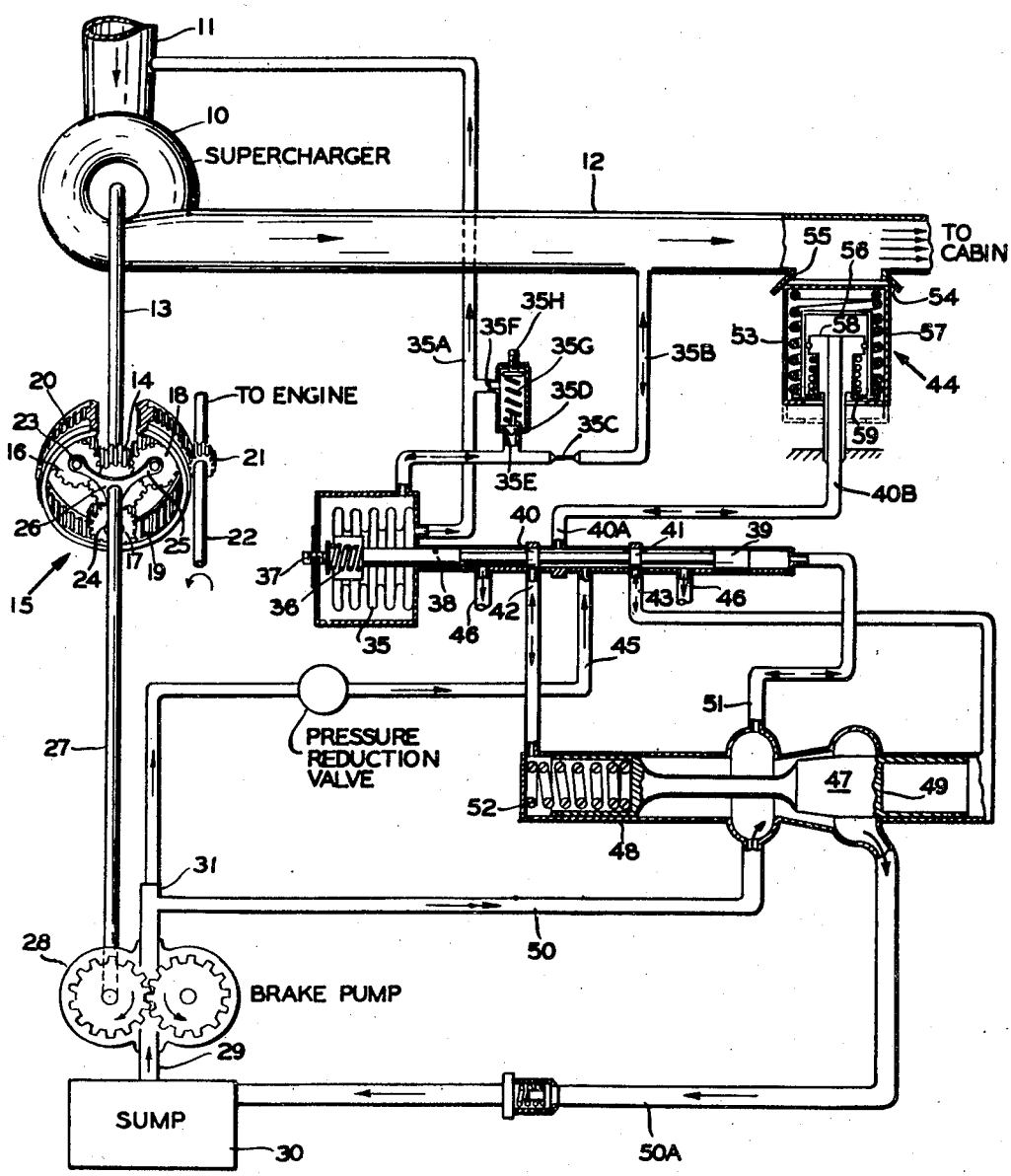
INVENTORS
HENRY TROEGER
DONALD M. LAWRENCE
ATTORNEY Patented May 18, 1948

2,441,779

UNITED STATES PATENT OFFICE 2,441,779

SUPERCHARGER REGULATOR AND SURGE CONTROL

Henry Troeger, Ramsey, and Donald Malcolm Lawrence, Wood Ridge, N. J., assignors to Bendix Aviation Corporation, Teterboro, N. J., a corporation of Delaware Application December 21, 1945, Serial No. 636,422

7 Claims. (Cl. 230—115)

Our invention relates to fluid flow systems, and particularly to a system for controlling the rate of flow of air to a pressurized enclosure, for instance the cabin of a high altitude aircraft.

One of the objects of our invention is to provide a fluid flow control system wherein a desired rate of air flow is maintained through pressure sensitive elements operating suitable monitoring devices.

Another object is to provide a fluid flow control system wherein automatic means are incorporated for preventing the maintenance of excessive rates of air flow.

A further object is to provide a system of the foregoing described character having means incorporated therein for precluding surging.

Another object is to provide a system of the character described having means for normally governing the control of a supercharger driving torque to maintain the torque substantially proportional to the pressure differential across the supercharger to thereby maintain the air flow more nearly constant.

Another object is to provide a system of the character described having pressure responsive means incorporated in the air outlet line ahead of the cabin which is operated by a back pressure existing in the line above a maximum setting to limit the maximum discharge pressure in case of line blockage and to also limit the maximum differential pressure delivered to the cabin.

Another object is to provide a fluid flow control system which is simple in construction, requiring but few elements and yet exceptionally efficient in operation.

Other objects will appear from a study of the following specification when made in conjunction with the attached drawings, throughout which like numerals designate like parts.

Referring to the drawings:

The single figure of the drawing is a diagram of a flow control system, certain of the elements being indicated diagrammatically as in section and others in perspective, embodying the present invention.

Referring in particular to the figure of the drawing, a supercharger or compressor 10 comprises an air inlet conduit 11 and an air outlet conduit 12 connected in the customary manner to a cabin of an aircraft or similar enclosure to be suitably pressurized irrespective of altitudes. The supercharger 10 is driven by a shaft 13 connected to a sun gear 14 of a planetary differential gear train 15, having planet pinions 16, 17 and 18 in engagement with the sun gear 14 and also in mesh with an internal spur gear 19. The spur gear 19 carries an external ring gear 20 in meshing engagement with a pinion 21 mounted on a shaft 22 operatively connected to an engine (not shown). The planet pinions 16, 17 and 18 have stub shafts carried by arms 23, 24, and 25 respectively, of a spider member 26. The spider member 26 is securely mounted on a shaft 27 drivingly connected to one of a pair of meshing gears rotatably mounted within the housing of a hydraulic brake pump 28. The pump 28 has an inlet conduit 29 communicating with a sump 30 which receives oil or similar liquid as the medium for the regulating part of the system and an outlet conduit 31 through which the oil is discharged under pressure therefrom for a purpose to be herein described.

The supercharger 10 will deliver air to the aircraft cabin at varying rates, depending upon its speed of rotation. In order to drive the supercharger 10 at a speed suitable to maintain a selected rate of air flow into the cabin, the differential gearing 15 and the pump 28 afford a means for controlling the speed of the supercharger 10 to give certain air-flow rates irrespective of the speed of the engine. In the structure of the present invention, the output pressure of the pump 28 is throttled in varying amounts under control of automatic means (to be described later) in order that the supercharger speed may be varied to deliver air in accordance with the airflow requirements of the supercharged cabin.

The air flow, in the present system is maintained more nearly constant than in other types of superchargers presumably because the regulation is effected by a regulator normally governing the control of a supercharger driving torque which is substantially proportional to the pressure differential across the supercharger.

The supercharger regulator includes an enclosed bellows 35 having a coil spring 36 engageable with one end of the bellows and a threaded screw 37 adjustably abutting the other end of the spring to set the normal flow relation desired. The inside of the bellows 35 is connected by a conduit 35a to the air inlet 11 while the outside is connected by a conduit 35b, having a restriction 35c, to the air outlet 12 to thereby afford a pressure differential across the supercharger 10. For varying the differential pressure a valve 35d is movably mounted on a valve seat port 35e formed in the conduit 35b ahead of the restriction 35c and a connecting intercommunicating passage 35f to the conduit 35a. A spring 35g engages the valve 35d and its tension is variable by a screw 35h adjustably engageable with the spring. The limiting valve 35d is so adjusted that the valve will open at a certain supercharger pressure differential thus permitting air to flow between the outlet conduit 35b, the restriction 35c, and to the inlet conduit 35a. The resulting drop across the restriction limits the bellows pressure differential, which in turn limits the torque to some desired maximum value. Limiting the torque also results in limiting the supercharger speed. Limitation of torque and speed are desirable in order to prevent overstressing of mechanical parts of the supercharger. A pilot valve 38 is axially positioned on the other side of the bellows 35 and has one end in engagement with the latter, the opposite end being formed with an enlarged piston head 39 which is acted upon by a pressure proportional to the torque driving the supercharger 10. The pilot valve 38 is further provided with two axially spaced valve lands 40 and 41 which are respectively nearly aligned with cooperating ports 42 and 43 to govern the regulator when the engine speed is adequate to maintain non-surging flow without opening a surge valve 44 in a manner to be later described. A 100 p. s. i. servo liquid supply port 45 is located midway between the ports 42 and 43 and waste ports 46 to the sump 30 lie outside the ports 42 and 43.

A throttle valve 47 has piston ends 48 and 49 acted upon respectively by the pilot governed pressures from the ports 42 and 43. The valve 47 has an oil or liquid inlet conduit 50 connected to the outlet 31 of the brake pump 28 and a return conduit 50a communicating with the sump 30, the valve also having an outlet conduit 51 at its intermediate portion, affording communication with the end of the piston 39 for the purpose heretofore explained. The valve 47 is slidable in opposite directions under the influence of the oil pressure to change its position relative to the oil flow to thereby vary the flow from the brake pump outlet 31. A coil spring 52 is mounted on one end of the valve 47 to normally urge the latter into unthrottled position. When the pilot 38 moves to the right, the throttling valve 47 moves floatingly to the left to increase the throttling action and hence the driving torque pressure which acts on the pilot 38 to keep it from overtraveling and hunting. The setting of the bellows spring 36 thus determines the flow relation as long as the engine speed is high enough to maintain a balancing torque pressure by operating the throttle valve 47, i. e., under normal operating conditions.

When the engine speed drops below this range to cause surging to be approached due to a decreased flow of air to the cabin, the throttling valve 47 has already reached its closed position but the torque pressure continues to drop. The result is that the pilot 38 slides gradually to the right until its land 40 is nearly aligned with a port 40a which is midway between the ports 42 and 45.

The surge control valve 44 comprises a hollow valve member 53 movably engageable with a complemental seat 54 which encircles an opening 55 communicating with the interior of the air discharge conduit 12. A cylinder 56 is disposed centrally within the valve member 53 and both are held normally in fixed relationship by means of a pressure relief spring 57. A fixed piston 58 slidably receives the cylinder 56 in such a manner as to open or close the opening 55 to surrounding atmosphere. A cylinder loading spring 59 between the cylinder 56 and the piston 58 acts in a manner to open the valve. A conduit 40b extends through the piston 58 and connects with the port 40a adjacent the pilot valve 38.

The port 40a carries servo pressure to the surge control valve 44 in a manner to close the valve 53 against the opposing action of its spring 59. This valve has additional resilient means so that it can also act as a pressure relief valve in the event of back pressure occurring in the outlet conduit 12. Normally the full 100 p. s. i. acts on the surge control valve 44 to keep the valve 53 closed. But when the land 40 lowers the pressure in the port 40a, this pressure drops so that the valve 53 opens enough to increase the flow of air above the surge limit and drop the supercharger differential pressure enough to keep the pilot 38 from overtraveling to the right, the result being a stable control of the surge valve 44 as long as the engine speed is below normal. Spring 36 is of such a stiffness that the endwise movement of the pilot land 40 from the port 40a occurs on a lowering of the torque pressure of 100 p. s. i.

In the illustrated planetary gear train, the torque developed by the sun gear 14 is a fixed proportion of the torque developed by the planetary spider 26. As the planetary spider drives the brake pump 28 and the pressure developed by the pump is proportional to the torque required to drive it, therefore the pump pressure is proportional to the torque driving the supercharger 10.

The operation is as follows:

The system will be said to be in balance when the speeds of all rotating members are constant, when the pilot valve 38 and throttle valve 47 are stationary and when the flow through the supercharger 10 and the supercharger pressure differential are constant. The pressure differential across the supercharger 10 is controlled by a separate means.

When the pilot valve 38 is in the position shown, both ports 42 and 43 connected to the piston ends of the throttle valve 47 are closed by the pilot valve lands 40 and 41 respectively and the throttle valve will be stationary. Liquid under pressure is supplied to the pilot valve 38 between these lands and through the port 40a connected to the surge control valve 44, applies pressure to the cylinder 56, thereby compressing the cylinder loading spring 59 and closing the valve 53. A displacement of the pilot valve 38 to the left will apply the liquid pressure to the left piston end 48 of the throttle valve 47 and simultaneously open to a waste port 46 to the right piston end 49 of the throttle valve, thereby causing the throttle valve to move to the right and unthrottle the pump discharge allowing the pump speed to increase, which will result in decreased supercharger speed, air flow and torque and hence a decrease in pump pressure. Conversely, a displacement of the pilot valve 38 to the right will throttle the pump discharge causing the pump speed to decrease which will result in increased supercharger speed, air flow and torque and hence an increase in pump pressure. Also, a further definite displacement of the pilot valve 38 to the right will move one land 40 over the port 40a connected to the surge control valve 44, thereby transferring the surge control valve connection from pressure to waste port 46, thus permitting the cylinder loading spring 59 to open the valve 53.

The pilot valve 38 is pushed to the right with a force equal to the bellows spring load plus the product of the bellows area and the bellows pressure differential and is pushed to the left with a force equal to the product of the pilot valve piston area and the pump pressure. The pilot valve 38 will be stationary and the system in balance only when these two forces are equal and only when the pilot valve lands 40 and 41 are in the position in which they close the ports 42 and 43 respectively leading to the throttle valve 47.

An increase in engine speed will increase the supercharger speed causing an increase in air flow and torque which will result in increased pump pressure which will push the pilot valve 38 to the left unthrottling the pump discharge and allowing the pump speed to increase, thereby lowering the supercharger speed and air flow until the system is restored to balance. Conversely a decrease in engine speed will result in further throttling of the pump 28 to restore the system to balance.

If the flow is decreased due to an increase in supercharger pressure differential, the bellows 35 will push the pilot valve 38 to the right further throttling the pump discharge lowering the pump speed, thereby increasing the supercharger speed and air flow until the system is restored to balance. Conversely a decrease in supercharger pressure differential will result in unthrottling of the pump discharge to restore the system to balance.

Although only one embodiment of the invention has been illustrated and described, various changes in the form and relative arrangements of the parts may be made to suit requirements.

What is claimed is:

1. A rate of flow regulator for controlling the amount of air delivered to a pressurized cabin of an aircraft, comprising: engine driving means having a variable operating speed; supercharger means having an air inlet and an air outlet conduit connected to the interior of the pressurized cabin to supply air thereto to maintain a selected pressure in the latter; said conduit being formed with an opening extending laterally through its wall for communication with the surrounding atmosphere; power transmitting means having a variable and controlled speed and drivingly connected to said supercharger means so as to establish relative speed differentials; means drivingly connecting said transmitting means to said engine driving means; means to control the speed of said transmitting means and thereby the relative speed of said supercharger means; pressure responsive means including a bellows having non-communicating compartments; an air line between the inlet side of said supercharger means and one of said compartments, a second air line having a restriction therein between the outlet side of said supercharger means and the other of said compartments, to thereby provide a pressure differential between said compartments; means operatively associated with said bellows to normally maintain said compartments in a balanced relation, to thereby effect flow of air to the cabin at a substantially constant rate; and yieldingly mounted valve means for normally closing said opening while said compartments are in such balanced relation but responsive to reduced flow through the conduit resulting from slow engine speed for opening said valve means to thereby preclude surging.

2. A rate of flow regulator for controlling the amount of air delivered to a pressurized cabin of an aircraft, comprising: engine driving means having a variable operating speed; supercharger means having an air inlet and an air outlet conduit connected to the interior of the pressurized cabin to supply air thereto to maintain a selected pressure in the latter; said conduit being formed with an opening extending laterally through its wall for communication with the surrounding atmosphere; power transmitting means having a variable and controlled speed and drivingly connected to said supercharger means so as to establish relative speed differentials; means drivingly connecting said transmitting means to said engine driving means; means to control the speed of said transmitting means and thereby the relative speed of said supercharger means; pressure responsive means including a bellows having noncommunicating compartments; an air line between the inlet side of said supercharger means and one of said compartments, a second air line having a restriction therein between the outlet side of said supercharger means and the other of said compartments, to thereby provide a pressure differential between said compartments; means opertively associated with said bellows to normally maintain said compartments in a balanced relation, to thereby effect flow of air to the cabin at a substantially constant rate; and yieldingly mounted valve means for normally closing said opening while said compartments are in such balanced relation but responsive to back pressure in said conduit for opening said valve means to thereby afford flow of air through the opening and thus preclude the formation of excessive pressures in the cabin.

3. A rate of flow regulator for controlling the amount of air delivered to a pressurized cabin of an aircraft, comprising: engine driving means having a variable operating speed; supercharger means having an air inlet and an air outlet conduit connected to the interior of the pressurized cabin to supply air thereto to maintain a selected pressure in the latter; said conduit being formed with an opening extending laterally through its wall for communication with the surrounding atmosphere; power transmitting means having a variable and controlled speed and drivingly connected to said supercharger means so as to establish relative speed differentials; means drivingly connecting said transmitting means to said engine driving means; means to control the speed of said transmitting means and thereby the relative speed of said supercharger means; pressure responsive means including a bellows having noncommunicating compartments; an air line between the inlet side of said supercharger means and one of said compartments, a second air line having a restriction therein between the outlet side of said supercharger means and the other of said compartments, to thereby provide a pressure differential between said compartments; means operatively associated with said bellows to normally maintain said compartments in a balanced relation, to thereby effect flow of air to the cabin at a substantially constant rate; and yieldingly mounted valve means for normally closing said opening while said compartments are in such balanced relation but responsive to back pressure in said conduit or to a reduced flow resulting from slow engine speed for opening said valve means to preclude the formation of excessive cabin pressure or surging.

4. A rate of flow regulator for controlling the amount of air delivered to a pressurized cabin of an aircraft, comprising: engine driving means having a variable operating speed; supercharger means having an air inlet and an air outlet connected to the interior of the pressurized cabin to supply air thereto to maintain a selected pressure in the latter; means providing relatively variable differential speeds, one of which is operatively connected with said supercharger means; means drivingly connecting said variable speed means to said engine driving means; means to control the speed of the other of the differential speeds of said variable speed means and thereby the relative speed of said supercharger means; pressure responsive means including a bellows having non-communicating compartments; an air line between the inlet side of said supercharger means and one of said compartments, a second air line having a restriction therein between the outlet side of said supercharger means and the other of said compartments, to thereby provide a pressure differential between said compartments; and means operatively associated with said bellows to normally maintain said compartments in a balanced relation, to thereby effect flow of air to the cabin at a substantially constant rate, any variation in the speed of said engine driving means being transmitted to one or the other of said compartments to render the latter in an unbalanced relation and thus modify the speed of said differential control means to change the air flow to the cabin until the selected pressure therein is reestablished whereby said compartments are again in balanced relation.

5. A rate of flow regulator for controlling the amount of air delivered to a pressurized cabin of an aircraft, comprising: engine driving means having a variable operating speed; supercharger means having an air inlet and an air outlet connected to the interior of the pressurized cabin to supply air thereto to maintain a selected pressure in the latter; power transmitting means having a variable and controlled speed and drivingly connected to said supercharger means so as to establish relative speed differentials; means drivingly connecting said transmitting means to said engine driving means; means to control the speed of said transmitting means and thereby the relative speed of said supercharger means; pressure responsive means including a bellows having non-communicating compartments; an air line between the inlet side of said supercharger means and one of said compartments, a second air line having a restriction therein between the outlet side of said supercharger means and the other of said compartments, to thereby provide a pressure differential between said compartments; means for adjusting the pressure relation between said compartments; a line extending from one air line to the other to afford communication therebetween and having one end connected between the restriction and said bellows; resilient valve means disposed in said line for normally precluding communication through the latter but responsive to pressure differentials in said air lines; said valve means being opened at a certain supercharger pressure differential to establish communication between said air lines and restriction, the drop across the latter limiting the bellows pressure differential which in turn limits the torque to some desired maximum value and thereby the supercharger speed; and means operatively associated with said bellows to normally maintain said compartments in a balanced relation, to thereby effect flow of air to the cabin at a substantially constant rate.

6. The combination with a pump, and driving means therefor, of a fluid-pressure brake comprising means including a movable member adapted to cause braking pressure; a differential gear train comprising input gear means adapted to be driven by the driving means, an output gear adapted to drive the pump, and means including differential control gear means adapted to drive the movable brake member, means connected across the pump between the inlet and outlet thereof including an element reversibly movable according to increase and decrease, respectively, in the pressure differential between the pump inlet and outlet, a conduit circuit including a throttle valve connected between the inlet and outlet of the brake, and a pilot valve in said circuit including movable valve means adapted for operation by said element to control the throttle valve to increase or decrease the braking pressure accordingly as the differential of the pump increases or decreases, respectively.

7. The combination with a pump, and driving means therefor, of a fluid-pressure brake comprising means including a movable member adapted to cause braking pressure; a differential gear train comprising input gear means adapted to be driven by the driving means, an output gear adapted to drive the pump, and means including differential control gear means adapted to drive the movable brake member, means connected across the pump between the inlet and outlet thereof including an element reversibly movable according to increase and decrease, respectively, in the pressure differential between the pump inlet and outlet, a conduit circuit including a throttle valve connected between the inlet and outlet of the brake, a pilot valve in said circuit including movable valve means adapted for operation by said element to control the throttle valve to increase or decrease the braking pressure accordingly as the differential of the pump increases or decreases, respectively, a valve aperture adapted to provide communication between the interior of said pump outlet and a region of lower pressure exterior thereto, and surge valve means including a movable member and connected to said circuit through said pilot valve, the pressure in said circuit normally causing said movable surge valve member to maintain said aperture closed but being affected when the speed of the movable member of the pump falls below a predetermined minimum to cause said movable surge valve member to open said aperture.

HENRY TROEGER.
DONALD MALCOLM LAWRENCE.

REFERENCES CITED

The following references are of record in the file of this patent:

UNITED STATES PATENTS

| Number | Name | Date |
| --- | --- | --- |
| 2,187,737 | Gregory | Jan. 23, 1940 |